US012515461B2

(12) United States Patent
Yonekubo et al.

(10) Patent No.: US 12,515,461 B2
(45) Date of Patent: Jan. 6, 2026

(54) PRINTING SYSTEM AND ESTIMATION METHOD

(71) Applicant: SEIKO EPSON CORPORATION, Tokyo (JP)

(72) Inventors: Shuji Yonekubo, Matsumoto (JP); Takuya Sonoyama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 18/461,228

(22) Filed: Sep. 5, 2023

(65) Prior Publication Data

US 2024/0076829 A1 Mar. 7, 2024

(30) Foreign Application Priority Data

Sep. 7, 2022 (JP) ................................. 2022-141998

(51) Int. Cl.
*B41J 3/407* (2006.01)
*B41J 11/00* (2006.01)

(52) U.S. Cl.
CPC ......... *B41J 3/4078* (2013.01); *B41J 11/0015* (2013.01)

(58) Field of Classification Search
CPC ............................. B41J 3/4078; B41J 11/0015
See application file for complete search history.

(56) References Cited

U.S. PATENT DOCUMENTS

2024/0326496 A1* 10/2024 Yamazaki .............. B41J 29/393

FOREIGN PATENT DOCUMENTS

CN 108660762 A * 10/2018 ................ D06P 5/30
JP 2022-003175 A 1/2022

* cited by examiner

*Primary Examiner* — Justin Seo
(74) *Attorney, Agent, or Firm* — WORKMAN NYDEGGER

(57) ABSTRACT

A printing system includes a pretreatment unit that applies a pretreatment liquid to a fabric, a printing unit that ejects a printing liquid to the fabric to which the pretreatment liquid was applied, a storage unit that stores a data table indicating a correspondence relationship between a time elapsed from manufacture of the pretreatment liquid and a rubbing fastness of the fabric on which the pretreatment liquid was used, and a control unit. The control unit includes an acquisition unit that acquires freshness information regarding freshness of the pretreatment liquid to be applied by the pretreatment unit and use date information indicating a time to use the pretreatment liquid, and an estimation unit that outputs, based on the freshness information, the use date information, and the data table, an estimation level of the rubbing fastness to be obtained by using the pretreatment liquid at the time indicated by the use date information.

7 Claims, 5 Drawing Sheets

| PRETREATMENT LIQUID | FABRIC | PRINTING LIQUID | | RUBBING FASTNESS (JIS) | | RUBBING FASTNESS (ISO) | |
|---|---|---|---|---|---|---|---|
| FRESHNESS | TYPE | COLOR | DUTY | DRY RUBBING FASTNESS | WET RUBBING FASTNESS | DRY RUBBING FASTNESS | WET RUBBING FASTNESS |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |

| PRINTING LIQUID | PRETREATMENT LIQUID | POSTTREATMENT LIQUID | DRY RUBBING FASTNESS | WET RUBBING FASTNESS |
|---|---|---|---|---|
| YELLOW | YES | NO | 4-5 | 3 |
| | YES | YES | 4-5 | 4 |
| ORANGE | YES | NO | 4 | 3 |
| | YES | YES | 4 | 4 |
| MAGENTA | YES | NO | 4-5 | 3 |
| | YES | YES | 4-5 | 4 |
| RED | YES | NO | 3-4 | 2 |
| | YES | YES | 4 | 4 |
| BLUE | YES | NO | 4 | 3 |
| | YES | YES | 3-4 | 4-5 |
| GREEN | YES | NO | 4-5 | 2-3 |
| | YES | YES | 4-5 | 4 |
| BLACK | YES | NO | 2 | 2 |
| | YES | YES | 4-5 | 4-5 |

FIG. 6

| PRETREATMENT LIQUID | FABRIC | PRINTING LIQUID | | RUBBING FASTNESS (JIS) | | RUBBING FASTNESS (ISO) | |
|---|---|---|---|---|---|---|---|
| FRESHNESS | TYPE | COLOR | DUTY | DRY RUBBING FASTNESS | WET RUBBING FASTNESS | DRY RUBBING FASTNESS | WET RUBBING FASTNESS |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |

FIG. 7

PRINTING SYSTEM AND ESTIMATION METHOD

The present application is based on, and claims priority from JP Application Serial Number 2022-141998, filed Sep. 7, 2022, the disclosure of which is hereby incorporated by reference herein in its entirety.

BACKGROUND

1. Technical Field

The present disclosure relates to a printing system and an estimation method.

2. Related Art

JP-A-2022-3175 describes that application of a pretreatment liquid to a fabric improves a rubbing fastness of the fabric.

The pretreatment liquid may deteriorate over time. When the deteriorating pretreatment liquid is used, an intended rubbing fastness may not be obtained. When the intended rubbing fastness is not obtained, a user replaces the pretreatment liquid and then performs printing again. This is troublesome for the user.

SUMMARY

A printing system for solving the above-described problem includes a pretreatment unit configured to apply a pretreatment liquid to a fabric, a printing unit configured to eject a printing liquid to the fabric to which the pretreatment liquid was applied, a storage unit configured to store a data table indicating a correspondence relationship between a time elapsed from manufacture of the pretreatment liquid and a rubbing fastness of the fabric on which the pretreatment liquid was used, and a control unit, wherein the control unit includes an acquisition unit configured to acquire freshness information regarding freshness of the pretreatment liquid to be applied by the pretreatment unit and use date information indicating a time to start using the pretreatment liquid, and an estimation unit configured to output, based on the freshness information, the use date information, and the data table, an estimation level of the rubbing fastness to be obtained by using the pretreatment liquid at the time indicated by the use date information.

An estimation method for solving the above-described problem is an estimation method for estimating a rubbing fastness of a fabric to which a pretreatment liquid is to be applied, the estimation method including acquiring freshness information regarding freshness of the pretreatment liquid to be applied to the fabric and use date information indicating a time to start using the pretreatment liquid, and outputting, based on the freshness information, the use date information, and a data table indicating a correspondence relationship between a time elapsed from manufacture of the pretreatment liquid and the rubbing fastness of the fabric on which the pretreatment liquid was used, an estimation level of the rubbing fastness to be obtained by using the pretreatment liquid at the time indicated by the use date information.

BRIEF DESCRIPTION OF THE DRAWINGS

FIG. 6 is a table showing, for each color of a printing liquid, changes in the rubbing fastness by the pretreatment liquid and a posttreatment liquid.

FIG. 7 is a table showing an example of a data table.

DESCRIPTION OF EMBODIMENTS

An embodiment of a printing system will be described below with reference to the accompanying drawings. The printing system is a system including an ink-jet printer printing a character and an image such as a photograph by ejecting ink, which is an example of a printing liquid, to a fabric such as a woven fabric or a knitted fabric.

Printing System

Figure 1:
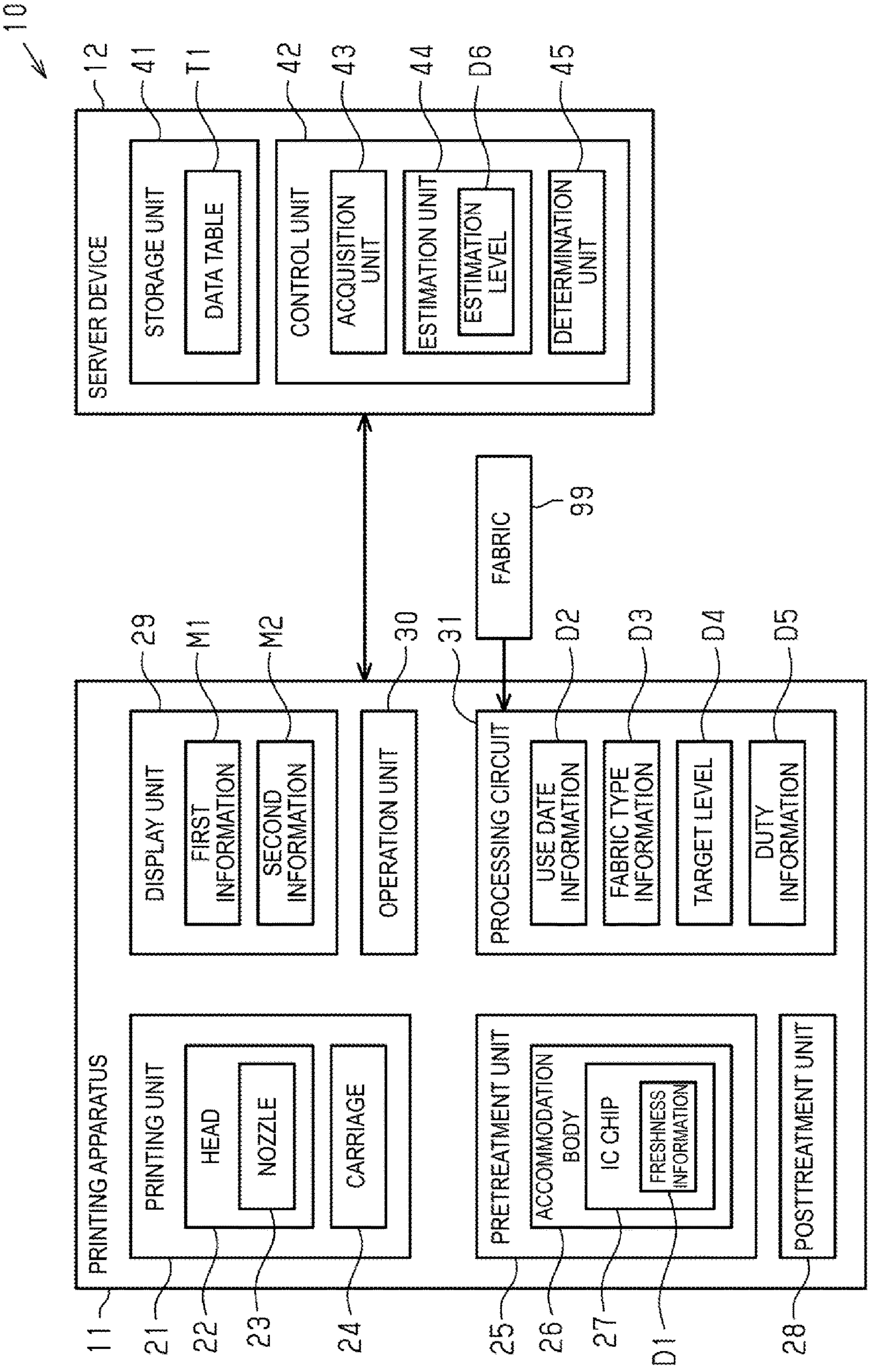
FIG. 1 is a block diagram illustrating an embodiment of a printing system.

As illustrated in FIG. 1, a printing system 10 includes a printing apparatus 11 and a server device 12. The printing system 10 is configured by connecting the printing apparatus 11 and the server device 12 in a communicable manner. The printing apparatus 11 and the server device 12 are connected by, for example, a network.

Printing Apparatus

The printing apparatus 11 includes a printing unit 21. The printing unit 21 is configured to perform printing on a fabric 99 by ejecting one or more printing liquids. The printing unit 21 ejects a printing liquid to the fabric 99 to which a pretreatment liquid described below has been applied. The printing unit 21 ejects, for example, a plurality of printing liquids having different colors. Examples of the plurality of printing liquids include cyan ink, magenta ink, yellow ink, and black ink. Examples of the printing liquids include pigment ink.

The printing unit 21 includes one or more heads 22. Each head 22 includes one or more nozzles 23. Each head 22 ejects the printing liquid from each nozzle 23 to the fabric 99.

The printing unit 21 may include a head 22 for each of the colors of the printing liquids. That is, the printing unit 21 may include a head 22 ejecting a cyan printing liquid, a head 22 ejecting a magenta printing liquid, a head 22 ejecting a yellow printing liquid, and a head 22 ejecting a black printing liquid. The printing unit 21 may include one head 22 ejecting the plurality of printing liquids. In other words, the head 22 may include one or more nozzles 23 ejecting a cyan printing liquid, one or more nozzles 23 ejecting a magenta printing liquid, one or more nozzles 23 ejecting a yellow printing liquid, and one or more nozzles 23 ejecting a black printing liquid.

The printing unit 21 may include a carriage 24. The head 22 is mounted at the carriage 24. The carriage 24 scans the fabric 99. The printing apparatus 11 is, for example, a serial printer in which the head 22 scans the fabric 99 together with the carriage 24. The printing apparatus 11 may be a line printer in which the heads 22 can simultaneously eject the printing liquids over the width of the fabric 99.

The printing apparatus 11 includes a pretreatment unit 25. The pretreatment unit 25 performs pretreatment on the fabric 99 before printing. The pretreatment unit 25 applies a pretreatment liquid to the fabric 99. The pretreatment liquid is a liquid promoting fixation of the printing liquid to the fabric 99. Specifically, the pretreatment liquid reacts with the printing liquid, so that pigments contained in the printing liquid coagulate. The pretreatment liquid contains, for example, a cationic resin. When the cationic resin reacts with the pigment ink, the pigments coagulate. Thus, an image printed on the fabric 99 can be easily fixed to the fabric 99. This results in improvement of the rubbing fastness of the fabric 99.

The rubbing fastness includes a dry rubbing fastness and a wet rubbing fastness. Application of the pretreatment liquid to the fabric 99 improves both the dry rubbing fastness and the wet rubbing fastness. Typically, when the pretreatment liquid is applied to the same fabric 99 under the same conditions, the dry rubbing fastness is equal to or greater than the wet rubbing fastness.

The rubbing fastness is evaluated based on standards such as JIS and ISO. The rubbing fastness is evaluated, for example, in nine grades from Grade 5 to Grade 1. As the grade increases, discoloring is less likely to occur, i.e., the rubbing fastness increases. The rubbing fastness is evaluated based on, for example, the reflection density of the printing liquid of the fabric 99 after a rubbing test.

The pretreatment unit 25 may apply the pretreatment liquid to the fabric 99 by ejecting the pretreatment liquid to the fabric 99. In this case, the pretreatment unit 25 includes the same head as the printing unit 21. The pretreatment unit 25 may include a head different from that of the printing unit 21 or the pretreatment unit 25 and the printing unit 21 may include the common head 22. That is, the printing apparatus 11 may include a head 22 ejecting the printing liquid and a head ejecting the pretreatment liquid or may include one head 22 including a nozzle 23 ejecting the printing liquid and a nozzle ejecting the pretreatment liquid. The pretreatment unit 25 ejects the pretreatment liquid to a region of the fabric 99 where the printing liquid is to be ejected. Thus, the region where the pretreatment liquid is ejected overlaps the region where the printing liquid is to be ejected.

The pretreatment unit 25 is not limited to those that eject the pretreatment liquid and may apply the pretreatment liquid to the fabric 99 by immersing the fabric 99 in the pretreatment liquid. In this case, the pretreatment unit 25 may include a storage tank storing the pretreatment liquid. The pretreatment unit 25 applies the pretreatment liquid to the fabric 99 by causing the fabric 99 to pass through the storage tank.

The pretreatment unit 25 is supplied with the pretreatment liquid from an accommodation body 26. The accommodation body 26 accommodates the pretreatment liquid. The accommodation body 26 is, for example, a cartridge attached to the pretreatment unit 25. The accommodation body 26 is attachable to and detachable from the pretreatment unit 25. The accommodation body 26 is not limited to the cartridge and may be, for example, a bottle injecting the pretreatment liquid into the pretreatment unit 25.

The accommodation body 26 includes an IC chip 27. The IC chip 27 stores freshness information D1. The freshness information D1 is information regarding the freshness of the pretreatment liquid accommodated in the accommodation body 26. When the pretreatment liquid containing a cationic resin is used, the freshness of the pretreatment liquid is represented by the amount of cation contained in the pretreatment liquid. The amount of cation contained in the pretreatment liquid changes over time. Specifically, the amount of cation contained in the pretreatment liquid decreases over time. That is, as the amount of cation contained in the pretreatment liquid decreases, the freshness of the pretreatment liquid decreases. Thus, the freshness of the pretreatment liquid can be regarded as a function of time. When the amount of cation contained in the pretreatment liquid decreases, the rubbing fastness of the fabric 99 on which the pretreatment liquid was used decreases from an intended value. That is, the rubbing fastness of the fabric 99 depends on the freshness of the used pretreatment liquid. Thus, the rubbing fastness of the fabric 99 can be regarded as a function of the freshness of the pretreatment liquid.

The freshness information D1 is factor information for estimating, based on a data table T1 described below, the freshness of the pretreatment liquid in the accommodation body 26 already mounted at the printing apparatus 11. In other words, the freshness information D1 is information indicating a factor regarding the rubbing fastness. The freshness information D1 may be, for example, information indicating the manufacture date of the pretreatment liquid, that is, the manufacturing time, or information indicating the use expiration date of the pretreatment liquid. The smaller the number of days elapsed from the manufacture date is or the larger the number of days remaining until the use expiration date is, the fresher the pretreatment liquid is. As to the pretreatment liquid containing a cationic resin, the smaller the number of days elapsed from the manufacture date is or the larger the number of days remaining until the use expiration date is, the higher the freshness is, that is, the larger the amount of cation is.

When the pretreatment liquid is fresher, the pretreatment liquid is more reactive with the printing liquid. The fresher pretreatment liquid more greatly contributes to improvement of the rubbing fastness. When the freshness of the pretreatment liquid is low, the degree of improvement in the rubbing fastness is small. That is, the degree of improvement in the rubbing fastness by the pretreatment liquid depends on the freshness of the pretreatment liquid, that is, a factor relating to the rubbing fastness. For example, when the factor is the manufacture date, the rubbing fastness increases as the number of days elapsed from the manufacture date decreases. Thus, when the freshness of the pretreatment liquid is low, that is, when the number of days elapsed from the manufacture date increases, it is more likely that the intended rubbing fastness may not be obtained.

Figure 2:
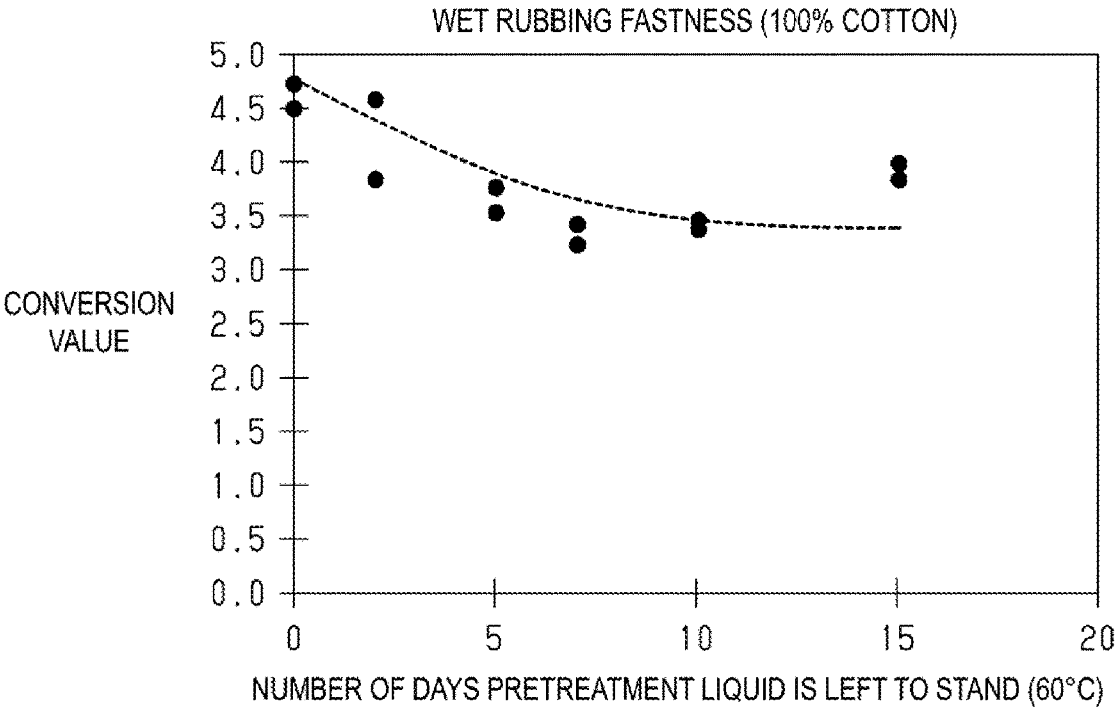
FIG. 2 is a graph showing a correspondence relationship between freshness of a pretreatment liquid and a dry rubbing fastness of a 100% cotton fabric on which the pretreatment liquid was used.
Figure 3:
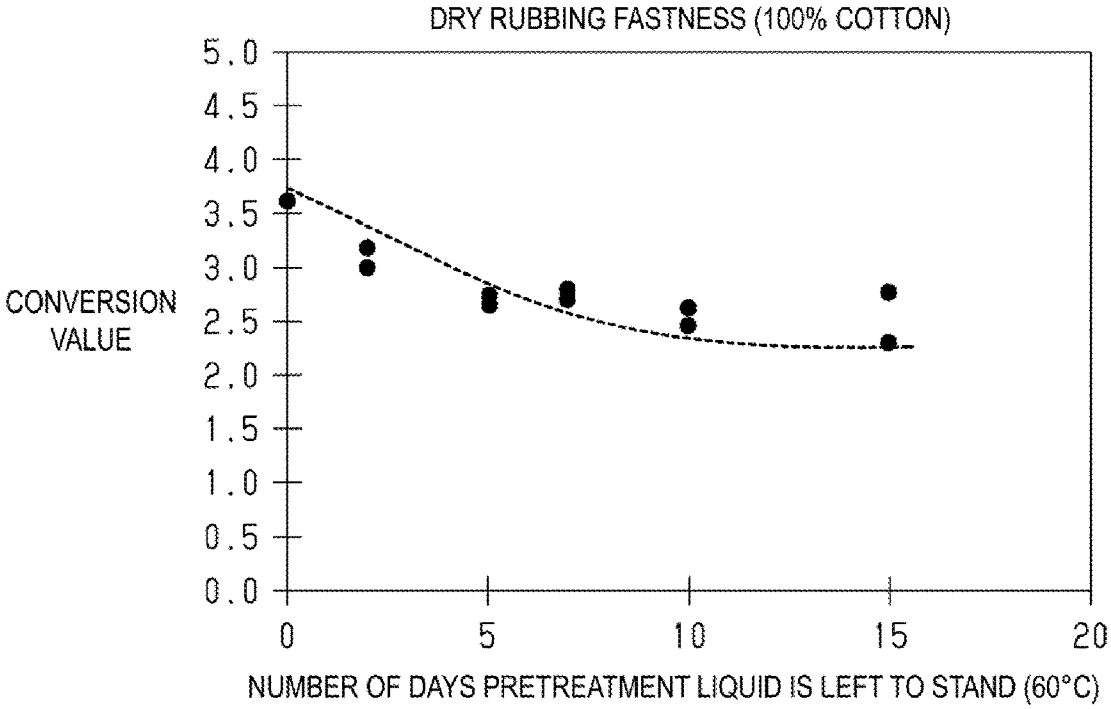
FIG. 3 is a graph showing a correspondence relationship between the freshness of the pretreatment liquid and a wet rubbing fastness of the 100% cotton fabric on which the pretreatment liquid was used.
Figure 4:
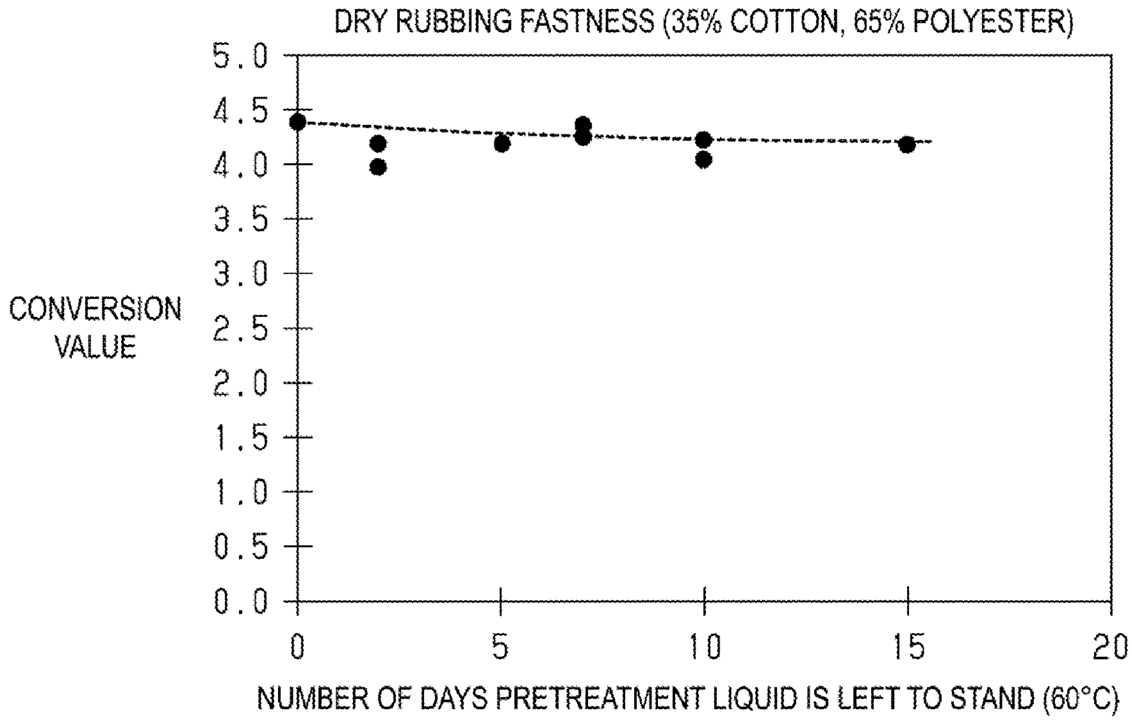
FIG. 4 is a graph showing a correspondence relationship between the freshness of the pretreatment liquid and a dry rubbing fastness of a fabric, made with 35% cotton and 65% polyester, on which the pretreatment liquid was used.
Figure 5:
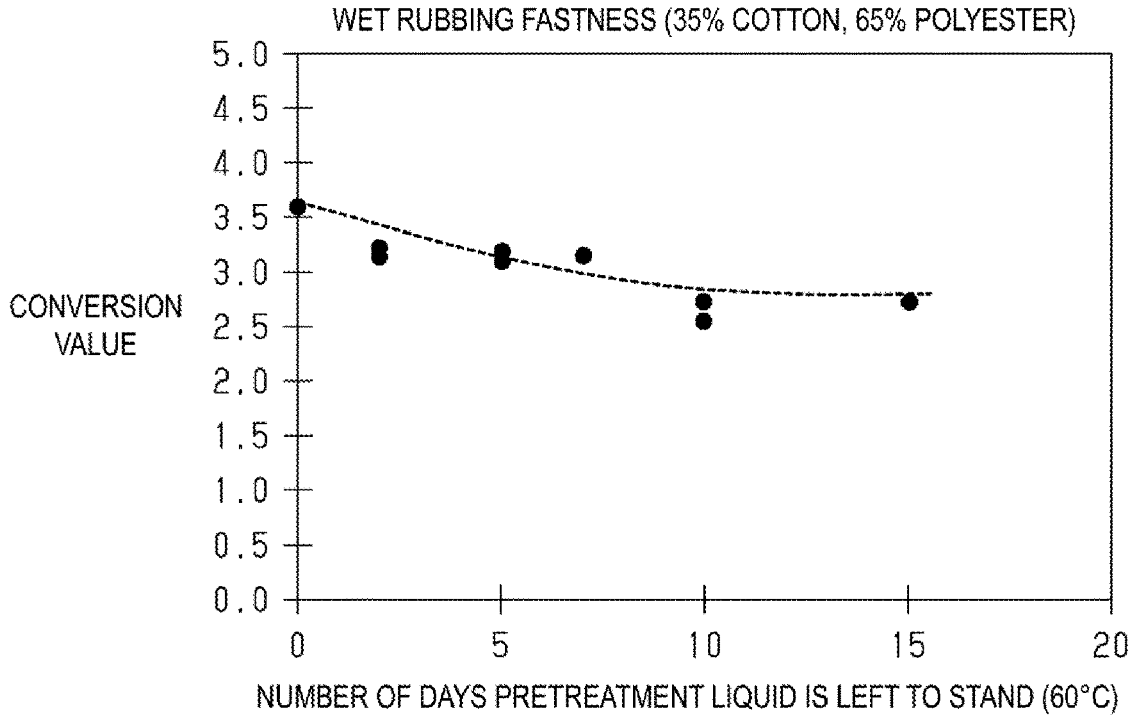
FIG. 5 is a graph showing a correspondence relationship between the freshness of the pretreatment liquid and a wet rubbing fastness of the fabric, made with 35% cotton and 65% polyester, on which the pretreatment liquid was used.

As shown in FIGS. 2, 3, 4, and 5, as the freshness of the pretreatment liquid decreases, the rubbing fastness obtained by using the pretreatment liquid decreases. In the graphs shown in FIGS. 2, 3, 4, and 5, the vertical axis represents the rubbing fastness of the fabric 99, and the horizontal axis represents the freshness of the pretreatment liquid. In detail, the vertical axis represents a value obtained by converting, into the rubbing fastness, the reflection density of the printing liquid of the fabric 99 after the rubbing test. The reflection density of the printing liquid of the pretreatment liquid is an optical density. For example, the conversion value of 5.0 represents Grade 5, and the conversion value of 3.5 represents Grade 3-4. The horizontal axis represents the time elapsed from manufacture of the pretreatment liquid. In more detail, the horizontal axis represents the number of days in which the pretreatment liquid is left to stand in an environment at a temperature of 60° C. At high temperatures, the pretreatment liquid significantly deteriorates. For example, the rubbing fastness of the fabric 99 on which the pretreatment liquid left to stand for five days in an environment at a temperature of 60° C. was used is substantially the same as the rubbing fastness of the fabric 99 on which the pretreatment liquid left to stand for six months in an environment at a temperature of 25° C. was used. Thus, the degree of deterioration of the pretreatment liquid left to stand for five days in an environment at a temperature of 60° C. is substantially the same as the degree of deterioration of the pretreatment liquid left to stand for six months in an environment at a temperature of 25° C. That is, the graphs shown in FIGS. 2, 3, 4, and 5 are results of evaluating, by an accelerated test, the correspondence relationship between the time elapsed from manufacture of the pretreatment liquid and the rubbing fastness of the fabric 99 on which the pretreatment liquid was used. The graphs shown in FIGS. 2 and 3 show the correspondence relationship between the freshness of the pretreatment liquid and the rubbing fastness of the 100% cotton fabric 99. The graphs shown in FIGS. 4 and 5 show the correspondence relationship between the freshness of the pretreatment liquid and the rubbing fastness of the fabric 99 made with 35% cotton and 65% polyester. Note that the graphs shown in FIGS. 2, 3, 4, and 5 may be subjected to nonlinear interpolation as appropriate by fitting or the like.

Even when the same pretreatment liquid is used, the correspondence relationship between the time elapsed from manufacture of the pretreatment liquid and the rubbing fastness of the fabric 99 on which the pretreatment liquid was used is different according to the type of the fabric 99. This is because the ease of fixation of the printing liquid is different according to the type of the fabric 99. In the case of the 100% cotton fabric 99, the rubbing fastness significantly decreases according to the freshness of the pretreatment liquid, whereas in the case of the fabric 99 made with 35% cotton and 65% polyester, the rubbing fastness moderately decreases according to the freshness of the pretreatment liquid.

Even when the pretreatment liquid having the same freshness is used, the rubbing fastness is different according to the type of the fabric 99. For example, when the pretreatment liquid left to stand for 0 day is used, the 100% cotton fabric 99 has a dry rubbing fastness of Grade 4-5 to Grade 5 and a wet rubbing fastness of Grade 3-4 to Grade 4. On the other hand, when the pretreatment liquid left to stand for 0 day is used, the fabric 99 made with 35% cotton and 65% polyester has a dry rubbing fastness of Grade 4-5 and a wet rubbing fastness of Grade 3-4.

As shown in FIG. 6, even when the same pretreatment liquid is used, the rubbing fastness is different according to the color of the printing liquid. This is because the reactivity with the pretreatment liquid is different according to the color of the printing liquid, that is, the type of the printing liquid. The rubbing fastness shown in FIG. 6 is a value evaluated based on ISO 105-X12. For example, in the case of a yellow printing liquid, the dry rubbing fastness is Grade 4-5 and the wet rubbing fastness is Grade 3, whereas in the case of a black printing liquid, the dry rubbing fastness is Grade 2 and the wet rubbing fastness is Grade 2. That is, the black printing liquid is difficult to be fixed to the fabric 99.

The rubbing fastness is different according to not only the type of the fabric 99 and the color of the printing liquid but also a printing duty. The printing duty indicates a ratio of an area printed per unit area when an image is printed on the fabric 99. That is, the printing duty is a ratio of an area occupied by the printing liquid per unit area. As the amount of the printing liquid ejected to the fabric 99 increases, the printing liquid is more difficult to be fixed to the fabric 99.

As illustrated in FIG. 1, the printing apparatus 11 may include a posttreatment unit 28. The posttreatment unit 28 performs posttreatment on the fabric 99 to which the printing liquid has been ejected. The posttreatment unit 28 performs posttreatment on the fabric 99 to improve the rubbing fastness of the fabric 99. Thus, when the fabric 99 has a sufficient rubbing fastness before the posttreatment, the posttreatment unit 28 does not perform the posttreatment on the fabric 99. That is, the posttreatment unit 28 performs the posttreatment on the fabric 99 when the rubbing fastness of the fabric 99 cannot be sufficiently obtained only by the pretreatment.

The posttreatment unit 28 applies a posttreatment liquid to the fabric 99, for example. The posttreatment liquid is a liquid covering an image printed on the fabric 99. The posttreatment liquid is a so-called overcoat liquid. The posttreatment liquid has a role of a protective layer by covering the image. Thus, the image is less likely to come off the fabric 99. This results in improvement of the rubbing fastness of the fabric 99. When the posttreatment liquid is applied to the fabric 99, the softness of the fabric 99 may be impaired. Thus, a sufficient rubbing fastness may be obtained using only the pretreatment liquid.

In a manner similar to the pretreatment unit 25, the posttreatment unit 28 may apply the posttreatment liquid to the fabric 99 by ejecting the posttreatment liquid to the fabric 99 or may apply the posttreatment liquid to the fabric 99 by immersing the fabric 99 in the posttreatment liquid. That is, the posttreatment unit 28 may include a head ejecting the posttreatment liquid or may include a storage tank storing the posttreatment liquid.

The posttreatment unit 28 is not limited to those that eject the posttreatment liquid and may dry the fabric 99, for example. For example, the posttreatment unit 28 dries the fabric 99 by heating the fabric 99. Although it is only slight as compared with the case where the posttreatment liquid is applied, drying the fabric 99 improves the rubbing fastness.

As shown in FIG. 6, the rubbing fastness is typically improved when the posttreatment liquid is applied to the fabric 99 as compared with the case where the posttreatment liquid is not applied to the fabric 99. For example, in the case of a black printing liquid, the dry rubbing fastness is Grade 4-5 and the wet rubbing fastness is Grade 4-5 when the posttreatment liquid is applied, whereas the dry rubbing fastness is Grade 2 and the wet rubbing fastness is Grade 2 when the posttreatment liquid is not applied.

As illustrated in FIG. 1, the printing apparatus 11 includes a display unit 29. The display unit 29 is configured to display information. The display unit 29 is, for example, a display. The display unit 29 displays, for example, information received from the server device 12. The display unit 29 may display first information M1 or second information M2 based on the information received from the server device 12. The first information M1 and the second information M2 will be described below.

The printing apparatus 11 includes an operation unit 30. The operation unit 30 may be, for example, a pointing device or a touch panel. The user can input information to the printing apparatus 11 or give an instruction to the printing apparatus 11 by operating the operation unit 30.

The printing apparatus 11 includes a processing circuit 31. The processing circuit 31 controls the printing apparatus 11. For example, the processing circuit 31 receives an instruction from the user through the operation unit 30, thereby controlling the printing apparatus 11 in accordance with the instruction. The processing circuit 31 communicates with the server device 12. The processing circuit 31 transmits and receives information to and from the server device 12.

The processing circuit 31 may be configured of one or more processors executing various types of processing in accordance with a computer program. The processing circuit 31 may be configured of one or more dedicated hardware circuits, such as an application-specific integrated circuit, executing at least some of the various types of processing. The processing circuit 31 may be configured of a circuit including a combination of a processor and a hardware circuit. The processor includes a CPU and a memory such as a RAM and a ROM. The memory stores a program code or a command configured to cause the CPU to execute processing. The memory, that is, a computer-readable medium, includes any readable medium that can be accessed by a general purpose or special purpose computer.

The processing circuit 31 acquires the freshness information D1. The processing circuit 31 acquires the freshness information D1 by reading the freshness information D1 from the IC chip 27. For example, the processing circuit 31 may acquire the freshness information D1 through the operation unit 30. In this case, the user inputs information described at the accommodation body 26, for example, the manufacture date of the pretreatment liquid and the use expiration date of the pretreatment liquid to the processing circuit 31 through the operation unit 30.

The processing circuit 31 may acquire use date information D2. The processing circuit 31 may acquire the current date and time counted by a timer (not illustrated) as the use date information D2. The timer is, for example, a circuit counting the current date and time and is included in the printing apparatus 11. The processing circuit 31 may acquire the current date and time as the use date information D2 through a network. The use date information D2 may be input to the processing circuit 31 through the operation unit 30 by the user who uses the printing apparatus 11, for example.

The use date information D2 is information indicating a time to start use of the pretreatment liquid, for example, a use date of starting use of the pretreatment liquid. Thus, when the freshness information D1 is information indicating the manufacture date, the use date information D2 is information indicating a date and time after the manufacture date. When the freshness information D1 is information indicating the use expiration date, the use date information D2 is information indicating a date and time before the use expiration date. Thus, the use date information D2 is information indicating a date and time after the manufacture date and before the use expiration date. This corresponds to the fact that the user uses the pretreatment liquid after the manufacture date and before the use expiration date. The use date information D2 is not limited to information indicating a date and time when the user actually uses the pretreatment liquid and may be information indicating a scheduled date and time when the user uses the pretreatment liquid. As a result, the freshness of the pretreatment liquid at the use date can be grasped from the freshness information D1 and the use date information D2. That is, by acquiring the use date information D2, not only the freshness of the pretreatment liquid at the current time but also the freshness of the pretreatment liquid at the scheduled use date after a predetermined period from the current time can be grasped.

The processing circuit 31 may acquire fabric type information D3. The fabric type information D3 is information indicating the type of the fabric 99 on which printing is to be performed. The fabric type information D3 indicates a mass ratio of fiber constituting the fabric 99, such as cotton, wool, silk, or polyester. The fabric type information D3 may include information indicating a way of weaving the fabric 99 and a way of knitting the fabric 99.

For example, the processing circuit 31 acquires the fabric type information D3 through the operation unit 30. In this case, the user inputs the mass ratio of the fiber constituting the fabric 99, the way of weaving, the way of knitting, and the like to the processing circuit 31 through the operation unit 30. The processing circuit 31 may acquire the fabric type information D3 from an analysis device analyzing the type of the fabric 99. For example, the analysis device may identify the mass ratio, the way of weaving, the way of knitting, and the like of the fiber constituting the fabric 99 by analyzing a captured image obtained by capturing the fabric 99.

The processing circuit 31 may acquire a target level D4. The target level D4 is information indicating the rubbing fastness of the fabric 99 desired by the user. The processing circuit 31 acquires the target level D4, for example, through the operation unit 30. In this case, the user inputs the desired rubbing fastness to the processing circuit 31 through the operation unit 30. The processing circuit 31 may acquire the target level D4 from a terminal such as a personal computer or a smart phone owned by the user.

The target level D4 may include information specifying a standard for the rubbing fastness. In this case, the target level D4 indicates the desired rubbing fastness in the ISO standard or the desired rubbing fastness in the JIS standard. For example, the user specifies the standard of the rubbing fastness through the operation unit 30.

The target level D4 may be information indicating the rubbing fastness of the fabric 99 desired by the user for each color of the printing liquid. In this case, the user specifies the desired rubbing fastness for each color of the printing liquid. Typically, the user specifies one desired rubbing fastness.

The processing circuit 31 may acquire duty information D5. The duty information D5 is information indicating a printing duty. The duty information D5 indicates a printing duty for each color of the printing liquid.

The processing circuit 31 acquires the duty information D5 based on, for example, image data to be printed. The processing circuit 31 acquires the image data, for example, through the operation unit 30. In this case, the user inputs the image data to the processing circuit 31 through the operation unit 30. The processing circuit 31 may acquire the image data from a terminal such as a personal computer or a smart phone owned by the user.

The processing circuit 31 transmits the acquired information to the server device 12. The processing circuit 31 transmits the acquired information to the server device 12, for example, before performing the pretreatment on the fabric 99. The processing circuit 31 transmits the freshness information D1 to the server device 12. The processing circuit 31 may transmit the use date information D2 to the server device 12. The processing circuit 31 may transmit the fabric type information D3 to the server device 12. The processing circuit 31 may transmit the target level D4 to the server device 12. The processing circuit 31 may transmit the duty information D5 to the server device 12.

Among the freshness information D1, the use date information D2, the fabric type information D3, the target level D4, and the duty information D5, the processing circuit 31 transmits at least the freshness information D1 to the server device 12. The processing circuit 31 transmits, for example, the freshness information D1, the use date information D2, the fabric type information D3, the target level D4, and the duty information D5 to the server device 12 in a mutually associated manner.

The processing circuit 31 receives, from the server device 12, information based on the transmitted information. For example, the processing circuit 31 displays the received information on the display unit 29. The processing circuit 31 may display the first information M1 or the second information M2 on the display unit 29 based on the received information. The processing circuit 31 may store the first information M1 and the second information M2 or may receive the first information M1 or the second information M2 from the server device 12.

Server Device

The server device 12 includes a storage unit 41. The storage unit 41 controls the server device 12. The storage unit 41 is, for example, a memory such as a RAM and a ROM. The storage unit 41 stores various programs.

The storage unit 41 stores at least one data table T1. The data table T1 indicates the correspondence relationship between a time elapsed from manufacture of the pretreatment liquid and the rubbing fastness of the fabric 99 on which the pretreatment liquid was used. That is, the data table T1 is a table in which the freshness of the pretreatment liquid and the rubbing fastness of the fabric 99 on which the pretreatment liquid was used are associated with each other. It can be said that the data table T1 is information indicating the reactivity with the printing liquid with respect to the freshness of the pretreatment liquid.

The data table T1 is data in which a parameter indicating the freshness of the pretreatment liquid and a parameter indicating the rubbing fastness of fabric 99 on which the pretreatment liquid was used are associated with each other. The parameter indicating the rubbing fastness may include a parameter indicating the dry rubbing fastness and a parameter indicating the wet rubbing fastness. The data table T1 may be obtained, for example, through an experiment of measuring the rubbing fastness of each of the fabrics 99 on which the pretreatment liquids different in freshness were used or may be obtained through a simulation. The graphs shown in FIGS. 2 to 5 are examples of the data table T1.

The storage unit 41 may store the plurality of data tables T1 so as to indicate, for each type of the fabric 99, the correspondence relationship between the freshness of the pretreatment liquid and the rubbing fastness. That is, the storage unit 41 may store, for each type of the fabric 99, the data table T1 in which the parameter indicating the freshness of the pretreatment liquid and the parameter indicating the rubbing fastness of the fabric 99 on which the pretreatment liquid was used are associated with each other. It can be said that each of the plurality of data tables T1 is associated with the parameter indicating the type of the fabric 99. Thus, the plurality of data tables T1 each can be represented by data in which the parameter indicating the freshness of the pretreatment liquid, the parameter indicating the rubbing fastness of the fabric 99 on which the pretreatment liquid was used, and the parameter indicating the type of the fabric 99 are associated with each other. The plurality of data tables T1 include, for example, the data table T1 indicating the correspondence relationship between the freshness of the pretreatment liquid and the rubbing fastness in the case of the 100% cotton fabric 99 and the data table T1 indicating the correspondence relationship between the freshness of the pretreatment liquid and the rubbing fastness in the case of the 100% wool fabric 99.

The storage unit 41 may store the plurality of data tables T1 so as to indicate, for each color of the printing liquid, the correspondence relationship between the freshness of the pretreatment liquid and the rubbing fastness. That is, the storage unit 41 may store, for each color of the printing liquid, the data table T1 in which the parameter indicating the freshness of the pretreatment liquid and the parameter indicating the rubbing fastness of the fabric 99 on which the pretreatment liquid was used are associated with each other. It can also be said that each of the plurality of data tables T1 is associated with the parameter indicating the color of the printing liquid. Thus, the plurality of data tables T1 each can be represented by data in which the parameter indicating the freshness of the pretreatment liquid, the parameter indicating the rubbing fastness of the fabric 99 on which the pretreatment liquid was used, and the parameter indicating the color of the printing liquid are associated with each other. The plurality of data tables T1 include, for example, the data table T1 indicating the correspondence relationship between the freshness of the pretreatment liquid and the rubbing fastness in the case of a yellow printing liquid and the data table T1 indicating the correspondence relationship between the freshness of the pretreatment liquid and the rubbing fastness in the case of a black printing liquid.

The storage unit 41 may store the plurality of data tables T1 so as to indicate, for each printing duty, the correspondence relationship between the freshness of the pretreatment liquid and the rubbing fastness. That is, the storage unit 41 may store, for each printing duty, the data table T1 in which the parameter indicating the freshness of the pretreatment liquid and the parameter indicating the rubbing fastness of the fabric 99 on which the pretreatment liquid was used are associated with each other. It can also be said that each of the plurality of data tables T1 is associated with the parameter indicating the printing duty. Thus, the plurality of data tables T1 each can be represented by data in which the parameter indicating the freshness of the pretreatment liquid, the parameter indicating the rubbing fastness of the fabric 99 on which the pretreatment liquid was used, and the parameter indicating the printing duty are associated with each other. The plurality of data tables T1 include, for example, the data table T1 indicating the correspondence relationship between the freshness of the pretreatment liquid and the rubbing fastness in the case of a predetermined printing liquid having a printing duty of 80%, and the data table T1 indicating the correspondence relationship between the freshness of the pretreatment liquid and the rubbing fastness in the case of a predetermined printing liquid having a printing duty of 60%.

The storage unit 41 may store the plurality of data tables T1 so as to indicate, for each standard of the rubbing fastness, the correspondence relationship between the freshness of the pretreatment liquid and the rubbing fastness. That is, the storage unit 41 may store, for each standard of the rubbing fastness, the data table T1 in which the parameter indicating the freshness of the pretreatment liquid and the parameter indicating the rubbing fastness of the fabric 99 on which the pretreatment liquid was used are associated with each other. It can also be said that each of the plurality of data tables T1 is associated with the parameter indicating the standard of the rubbing fastness. Thus, the plurality of data tables T1 each can be represented by data in which the parameter indicating the freshness of the pretreatment liquid, the parameter indicating the rubbing fastness of the fabric 99 on which the pretreatment liquid was used, and the parameter indicating the standard of the rubbing fastness are associated with each other. The plurality of data tables T1 include, for example, the data table T1 indicating the correspondence relationship between the freshness of the pretreatment liquid and the rubbing fastness based on the JIS standard and the data table T1 indicating the correspondence relationship between the freshness of the pretreatment liquid and the rubbing fastness based on the ISO standard. The standard of the desired rubbing fastness may be different according to the user. Thus, the storage unit 41 may store the plurality of data tables T1 each indicating the rubbing fastness evaluated based on the standard such as ISO or JIS.

As shown in FIG. 7, the plurality of data tables T1 each can be represented by data in which, for example, the parameter indicating the freshness of the pretreatment liquid, the parameter indicating the type of the fabric 99, the parameter indicating the color of the printing liquid, the parameter indicating the printing duty, the parameter indicating the standard of the rubbing fastness, and the parameter indicating the rubbing fastness are associated with each other. The plurality of data tables T1 each can be represented by data in which, among the parameter indicating the rubbing fastness, the parameter indicating the type of the fabric 99, the parameter indicating the color of the printing liquid, the parameter indicating the printing duty, and the parameter indicating the standard of the rubbing fastness, at least the parameter indicating the rubbing fastness is associated with the parameter indicating the freshness of the pretreatment liquid.

As illustrated in FIG. 1, the server device 12 includes a control unit 42. The control unit 42 controls the server device 12. The control unit 42 includes, for example, a CPU. The control unit 42 may include a hardware circuit.

The control unit 42 includes an acquisition unit 43. The acquisition unit 43 acquires information from the printing apparatus 11. The acquisition unit 43 is, for example, an interface communicating with the outside. The acquisition unit 43 acquires, for example, the freshness information D1, the use date information D2, the fabric type information D3, the target level D4, and the duty information D5. The acquisition unit 43 acquires, for example, the freshness information D1, the use date information D2, the fabric type information D3, the target level D4, and the duty information D5 through the processing circuit 31. For example, the acquisition unit 43 may acquire the current date and time counted by the timer (not illustrated) as the use date information D2. The timer is, for example, a circuit counting the current date and time and is included in the server device 12. The acquisition unit 43 may acquire the current date and time as the use date information D2 through a network.

The control unit 42 includes an estimation unit 44. The estimation unit 44 executes estimation processing of estimating the rubbing fastness by referring to the data table T1 based on information acquired from the printing apparatus 11. The control unit 42 functions as the estimation unit 44 by executing a program defining the estimation processing. The program defining the estimation processing is stored in, for example, the storage unit 41.

The estimation unit 44 outputs an estimation level D6 indicating an estimated rubbing fastness. Thus, the estimation unit 44 outputs the estimation level D6 of the rubbing fastness based on the information acquired by the acquisition unit 43 and the data table T1. Specifically, the estimation unit 44 outputs the estimation level D6 based on the information including at least the freshness information D1 and the use date information D2 and the data table T1.

Based on the freshness information D1 and the use date information D2, the estimation unit 44 outputs the estimation level D6 of the rubbing fastness estimated to be obtained when the pretreatment liquid having the freshness indicated by the freshness information D1 and the use date information D2 is used. When the storage unit 41 stores, for example, the data table T1 shown in FIG. 3, the estimation unit 44 outputs the estimation level D6 based on the freshness information D1, the use date information D2, and the data table T1 illustrated in FIG. 3. When the freshness information D1 is, for example, information indicating the manufacturing time, the estimation unit 44 regards a specific date of the manufacturing time as the origin of the horizontal axis of the data table T1 shown in FIG. 3. That is, the value of the origin of the horizontal axis of the data table T1 shown in FIG. 3 is updated to the value at the specific date of the manufacturing time. Then, the estimation unit 44 extracts the value of the vertical axis at the date after the date (origin) of the manufacturing time, that is, the date indicated by the use date information D2 with reference to the data table T1 shown in FIG. 3. In summary, the estimation unit 44 outputs the estimation level D6 by extracting the value of the vertical axis at the date indicated by the use date information D2 using the date of the manufacturing time as a beginning date. Note that the beginning date is not limited to the date of the manufacturing time, but may be the use expiration date.

For example, based on the freshness information D1 and the use date information D2, the estimation unit 44 may output, for each color of the printing liquid, the estimation level D6 of the rubbing fastness estimated to be obtained when the pretreatment liquid having the freshness indicated by the freshness information D1 and the use date information D2 is used. For example, based on the freshness information D1, the use date information D2, and the fabric type information D3, the estimation unit 44 may output the estimation level D6 of the rubbing fastness estimated to be obtained when the pretreatment liquid having the freshness indicated by the freshness information D1 and the use date information D2 is used on the fabric 99 indicated by the fabric type information D3. For example, based on the freshness information D1, the use date information D2, and the duty information D5, the estimation unit 44 may output the estimation level D6 of the rubbing fastness estimated to be obtained when the pretreatment liquid having the freshness indicated by the freshness information D1 and the use date information D2 is used and then printing is performed with the amount of the printing liquid indicated by the duty information D5.

The estimation unit 44 may output the estimation level D6 to the printing apparatus 11. In this case, the estimation level D6 is displayed on the display unit 29. The user can grasp the estimation level D6 by checking the display unit 29. That is, the user can grasp the rubbing fastness based on the freshness of the pretreatment liquid without performing printing. In the example, the estimation unit 44 outputs the estimation level D6 to a determination unit 45 described below.

When estimating the rubbing fastness for each color of the printing liquid, the estimation unit 44 may output the estimation level D6 of the rubbing fastness estimated for each of the plurality of printing liquids. In addition, when estimating the rubbing fastness for each color of the printing liquid, the estimation unit 44 may output the estimation level D6 of one representative rubbing fastness among these rubbing fastnesses. For example, when estimating the rubbing fastness for each color of the printing liquid, the estimation unit 44 may output the estimation level D6 of the lowest rubbing fastness among the respective rubbing fastnesses estimated for the plurality of printing liquids. For example, when estimating the rubbing fastness for each color of the printing liquid, the estimation unit 44 may output the estimation level D6 of the rubbing fastness related to the printing liquid having the largest printing duty among the respective rubbing fastnesses estimated for the plurality of printing liquids.

The control unit 42 may include the determination unit 45. The determination unit 45 executes determination processing of determining whether the estimation level D6 is equal to or higher than the target level D4. The control unit 42 functions as the determination unit 45 by executing a program defining the determination processing. The program defining the determination processing is stored in, for example, the storage unit 41.

Based on the estimation level D6 output by the estimation unit 44 and the target level D4 acquired by the acquisition unit 43, the determination unit 45 outputs a determination result indicating whether the estimation level D6 is equal to or higher than the target level D4. For example, the determination unit 45 outputs the determination result to the printing apparatus 11. The determination result is displayed on the display unit 29 as the first information M1 or the second information M2. The user can understand whether the estimation level D6 is equal to or higher than the target level D4 by checking the first information M1 or the second information M2. That is, the user can understand whether the desired rubbing fastness can be obtained based on the freshness of the pretreatment liquid without performing printing.

When the estimation level D6 is lower than the target level D4, the determination unit 45 may determine whether the rubbing fastness equal to or higher than the target level D4 can be obtained by replacement of the pretreatment liquid. The determination unit 45 can determine, by referring to the data table T1, whether the rubbing fastness equal to or higher than the target level D4 can be obtained by replacement of the pretreatment liquid. When determining that the rubbing fastness equal to or higher than the target level D4 can be obtained by replacement of the pretreatment liquid, the determination unit 45 may output a replacement indicator indicating the freshness of the pretreatment liquid necessary for obtaining the rubbing fastness equal to or higher than the target level D4. The determination unit 45 may output, for example, a limit of the number of days elapsed from the manufacture date or a limit of the number of days remaining until the use expiration date as the replacement indicator. In this case, the user checks the replacement indicator such as the limit of the number of elapsed days or the limit of the number of remaining days, thereby understanding that the pretreatment liquid the number of elapsed days of which does not exceed the limit of the number of elapsed days or the pretreatment liquid the number of remaining days of which is larger than the limit of the number of remaining days should be used.

First Information and Second Information

Next, the first information M1 and the second information M2 will be described.

The first information M1 is displayed on the display unit 29 when the determination unit 45 determines that the estimation level D6 is equal to or higher than the target level D4. That is, the first information M1 is information indicating that the estimation level D6 is equal to or higher than the target level D4. The first information M1 is, for example, a message. The first information M1 is displayed on the display unit 29, so that the user understands that the estimation level D6 is equal to or higher than the target level D4, that is, the desired rubbing fastness can be obtained using the pretreatment liquid in use.

The second information M2 is displayed on the display unit 29 when the determination unit 45 determines that the estimation level D6 is lower than the target level D4. That is, the second information M2 is information indicating that the estimation level D6 is lower than the target level D4. The second information M2 is, for example, a message. The second information M2 is displayed on the display unit 29, so that the user understands that the estimation level D6 is lower than the target level D4, that is, the desired rubbing fastness cannot be obtained using the pretreatment liquid in use.

The second information M2 may include a message prompting replacement of the pretreatment liquid. The second information M2 may include a message prompting performing of the posttreatment. In this case, the second information M2 may include a posttreatment condition indicating a specific condition of the posttreatment. Examples of the posttreatment condition include the type of the posttreatment liquid, the concentration of the posttreatment liquid, the drying temperature, and the drying time.

Flowchart

Next, the estimation processing indicating an estimation method for estimating the rubbing fastness will be described. The estimation processing is executed in the printing system 10 before the printing apparatus 11 performs printing on the fabric 99. The estimation processing is executed, for example, when information is transmitted from the printing apparatus 11 to the server device 12. In the example, the estimation processing includes the determination processing.

Figure 8:
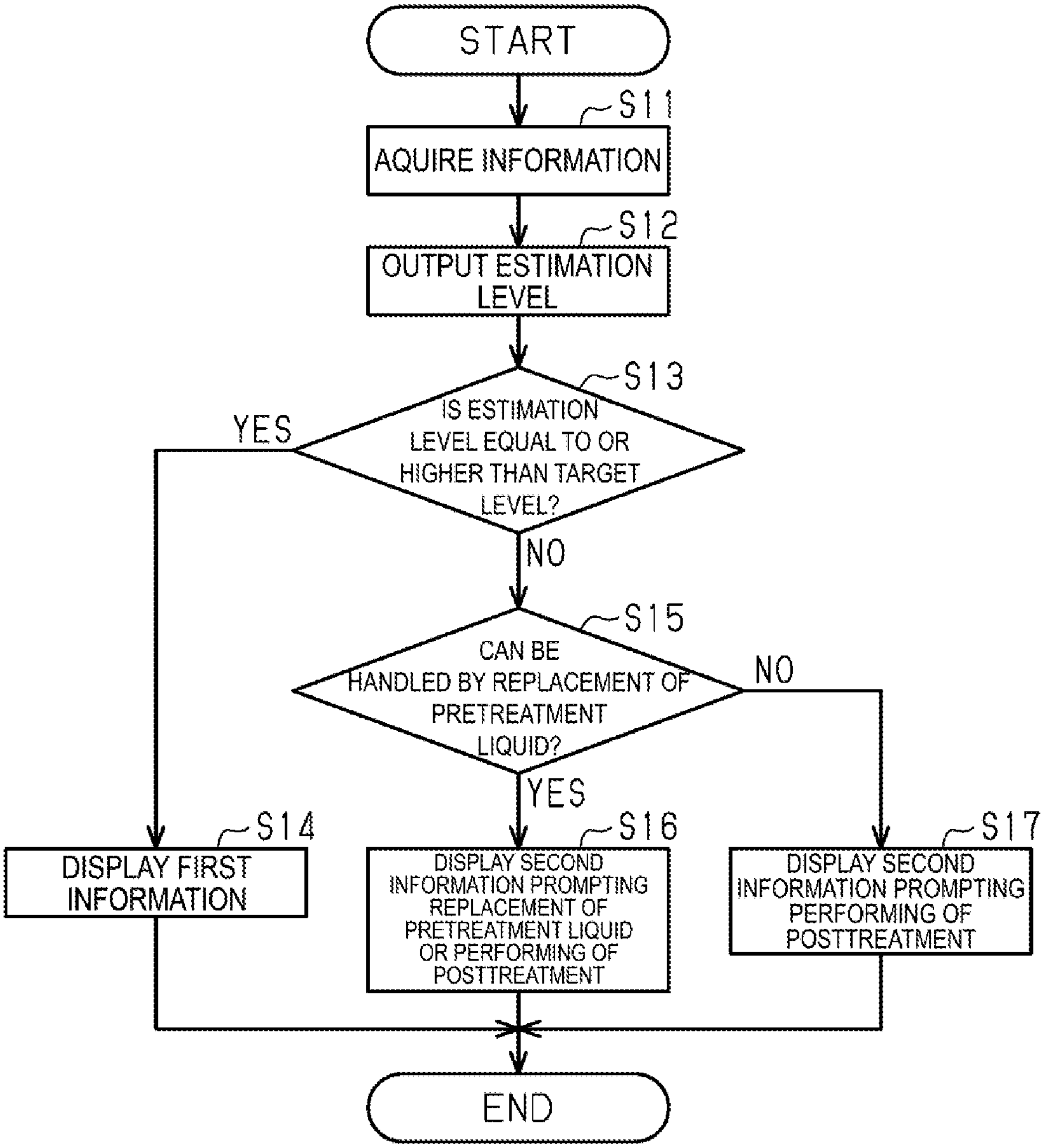
FIG. 8 is a flowchart illustrating an example of estimation processing.

As illustrated in FIG. 8, in step S11, the acquisition unit 43 acquires information from the printing apparatus 11. Specifically, the acquisition unit 43 acquires information including the freshness information D1 from the printing apparatus 11. The acquisition unit 43 may acquire the use date information D2 from the printing apparatus 11, may acquire the use date information D2 from the server device 12, or may acquire the use date information D2 from the outside through a network.

In step S12, the estimation unit 44 estimates the rubbing fastness based on the information including the freshness information D1 and the use date information D2. Thus, the estimation level D6 is output. The estimation level D6 may be output to the printing apparatus 11. In this case, the estimation processing ends.

In step S13, the determination unit 45 determines whether the estimation level D6 is equal to or higher than the target level D4. When the determination unit 45 determines that the estimation level D6 is equal to or higher than the target level D4, the processing proceeds to step S14. When the determination unit 45 determines that the estimation level D6 is lower than the target level D4, the processing proceeds to step S15.

In step S14, the display unit 29 displays the first information M1 based on the determination result. The display unit 29 displays the first information M1, and thus the estimation processing ends.

In step S15, the determination unit 45 determines whether the rubbing fastness equal to or higher than the target level D4 can be obtained by replacement of the pretreatment liquid. When the determination unit 45 determines that the rubbing fastness equal to or higher than the target level D4 can be obtained by replacement of the pretreatment liquid, the processing proceeds to step S16. When the determination unit 45 determines that the rubbing fastness equal to or higher than the target level D4 cannot be obtained by replacement of the pretreatment liquid, the processing proceeds to step S17.

In step S16, the display unit 29 displays the second information M2 based on the determination result. Specifically, the display unit 29 displays information prompting replacement of the pretreatment liquid or performing of the posttreatment. The user obtains the fabric 99 having a desired rubbing fastness by replacing the pretreatment liquid or performing the posttreatment. The display unit 29 displays the second information M2, and thus the estimation processing ends.

In step S17, the display unit 29 displays the second information M2 based on the determination result. Specifically, the display unit 29 displays information prompting performing of the posttreatment. The user performs the posttreatment, thereby obtaining the fabric 99 having a desired rubbing fastness. The display unit 29 displays the second information M2, and thus the estimation processing ends.

As described above, the estimation method indicated by the estimation processing includes acquiring the freshness information D1 and the use date information D2 and outputting the estimation level D6 based on the freshness information D1, the use date information D2, and the data table T1. The estimation method further includes determining whether the estimation level D6 is equal to or higher than the target level D4 and displaying the first information M1 or the second information M2 based on the determination result.

Actions and Effects

Next, actions and effects of the example described above will be described.

(1) The control unit 42 includes the acquisition unit 43 that acquires the freshness information D1 and the use date information D2, and the estimation unit 44 that outputs the estimation level D6 of the rubbing fastness based on the freshness information D1, the use date information D2, and the data table T1.

The freshness of the pretreatment liquid at the time indicated by the use date information D2 can be grasped based on the freshness information D1 and the use date information D2. Thus, according to the above-described configuration, the printing system 10 estimates the rubbing fastness to be obtained when the pretreatment liquid having the freshness indicated by the freshness information D1 and the use date information D2 is used. As a result, the user can grasp the rubbing fastness without performing printing. This reduces the user's time and effort.

(2) The estimation unit 44 outputs the estimation level D6 corresponding to the fabric type indicated by the fabric type information D3 based on the freshness information D1, the use date information D2, the fabric type information D3, and the data table T1.

According to the above-described configuration, the printing system 10 estimates the rubbing fastness to be obtained when the pretreatment liquid having the freshness indicated by the freshness information D1 and the use date information D2 is used on the fabric 99 indicated by the fabric type information D3. Thus, the user can grasp the rubbing fastness according to the type of the fabric 99 without performing printing.

(3) The estimation unit 44 outputs the estimation level D6 of the rubbing fastness for each color of the printing liquid based on the freshness information D1, the use date information D2, and the data table T1.

According to the above-described configuration, the printing system 10 estimates, for each color of the printing liquid, the rubbing fastness to be obtained when the pretreatment liquid having the freshness indicated by the freshness information D1 and the use date information D2 is used. As a result, the user can grasp the rubbing fastness for each color of the printing liquid without performing printing.

(4) The display unit 29 displays the first information M1 when the determination unit 45 determines that the estimation level D6 is equal to or higher than the target level D4. The display unit 29 displays the second information M2 when the determination unit 45 determines that the estimation level D6 is lower than the target level D4. According to the above-described configuration, the user can understand whether the estimation level D6 is equal to or higher than the target level D4 by checking the first information M1 or the second information M2.

(5) The second information M2 includes a message prompting performing of the posttreatment.

According to the above-described configuration, when the estimation level D6 is lower than the target level D4, the user can understand that the posttreatment by the posttreatment unit 28 should be performed.

(6) The second information M2 includes a message prompting replacement of the pretreatment liquid to be applied to the fabric 99 by the pretreatment unit 25.

According to the above-described configuration, when the estimation level D6 is lower than the target level D4, the user can understand that the pretreatment liquid should be replaced.

Modifications

The above-described example can be modified and implemented as follows. The above-described example and the following modifications can be mutually combined and implemented within a technically consistent range.

When the determination unit 45 determines that the estimation level D6 is lower than the target level D4, the content of the second information M2 displayed by the display unit 29 may be different according to the difference between the estimation level D6 and the target level D4. For example, the display unit 29 may display, as the second information M2, a message indicating the magnitude of the difference between the estimation level D6 and the target level D4 in stages according to the difference between the estimation level D6 and the target level D4.

The printing system 10 may be configured of the printing apparatus 11 and a personal computer owned by the user. In this case, the personal computer includes the storage unit 41 and the control unit 42.

The processing circuit 31 may acquire, based on a user operation, instruction information for instructing the printing apparatus 11 to output the estimation level D6. The acquisition unit 43 may acquire, based on a user operation, instruction information for instructing the server device 12 to output the estimation level D6. In this case, the acquisition unit 43 may acquire the instruction information via the processing circuit 31. The instruction information may be input to the processing circuit 31 by the user operating the operation unit 30.

The time indicated by the use date information D2 may be a date and time when the processing circuit 31 acquires the instruction information or may be a date and time when the acquisition unit 43 acquires the instruction information. For example, the timer may calculate the date and time when the processing circuit 31 acquires the instruction information.

The processing circuit 31 may execute the estimation processing of estimating the rubbing fastness. In other words, the estimation method for estimating the rubbing fastness may be applied to the printing apparatus 11. In this case, the processing circuit 31 corresponds to the acquisition unit 43 and the estimation unit 44. The functional units such as the acquisition unit 43 and the estimation unit 44 included in the server device 12 may be included in the printing apparatus 11. For example, the printing apparatus 11 may estimate the rubbing fastness by reading the data table T1 stored in the server device 12.

Technical Idea

Hereinafter, technical ideas and working effects thereof understood from the above-described example and modifications will be described.

(A) A printing system includes a pretreatment unit configured to apply a pretreatment liquid to a fabric, a printing unit configured to eject a printing liquid to the fabric to which the pretreatment liquid was applied, a storage unit configured to store a data table indicating a correspondence relationship between a time elapsed from manufacture of the pretreatment liquid and a rubbing fastness of the fabric on which the pretreatment liquid was used, and a control unit, wherein the control unit includes an acquisition unit configured to acquire freshness information regarding freshness of the pretreatment liquid to be applied by the pretreatment unit and use date information indicating a time to start using the pretreatment liquid, and an estimation unit configured to output, based on the freshness information, the use date information, and the data table, an estimation level of the rubbing fastness to be obtained by using the pretreatment liquid at the time indicated by the use date information.

The freshness of the pretreatment liquid at the time indicated by the use date information can be grasped from the freshness information and the use date information. Thus, according to the above-described configuration, the printing system estimates the rubbing fastness to be obtained when the pretreatment liquid having the freshness indicated by the freshness information and the use date information is used. As a result, the user can grasp the rubbing fastness without performing printing. This reduces the user's time and effort.

(B) In the above-described printing system, the storage unit may store the data table for an individual type of the fabric, the acquisition unit may acquire fabric type information indicating a type of the fabric to be used for printing, and the estimation unit may output the estimation level based on the freshness information, the use date information, the fabric type information, and the data table.

The correspondence relationship between the time elapsed from manufacture of the pretreatment liquid and the rubbing fastness of the fabric on which the pretreatment liquid was used exhibits a different characteristic according to the type of the fabric. According to the above-described configuration, the printing system estimates the rubbing fastness to be obtained when the pretreatment liquid having the freshness indicated by the freshness information and the use date information is used on the fabric indicated by the fabric type information. Thus, the user can grasp the rubbing fastness according to the type of the fabric without performing printing.

(C) In the printing system described above, the storage unit may store the data table for an individual color of the printing liquid, and the estimation unit may output, based on the freshness information, the use date information, and the data table, the estimation level for the individual color of the printing liquid.

The correspondence relationship between the time elapsed from manufacture of the pretreatment liquid and the rubbing fastness of the fabric on which the pretreatment liquid was used exhibits a different characteristic according to the color of the printing liquid. According to the above-described configuration, the printing system estimates, for each color of the printing liquid, the rubbing fastness to be obtained when the pretreatment liquid having the freshness indicated by the freshness information and the use date information is used. As a result, the user can grasp the rubbing fastness for each color of the printing liquid without performing printing.

(D) The above-described printing system may include a display unit configured to display information, wherein the acquisition unit may acquire a target level indicating a rubbing fastness desired by a user, the control unit may include a determination unit configured to determine whether the estimation level output by the estimation unit is equal to or higher than the target level, the display unit may display first information when the determination unit determines that the estimation level is equal to or higher than the target level, and the display unit may display second information different from the first information when the determination unit determines that the estimation level is lower than the target level. According to the above-described configuration, the user can understand whether the estimation level is equal to or higher than the target level by checking the first information or the second information.

(E) The above-described printing system may include a posttreatment unit configured to perform posttreatment on the fabric to which the printing liquid was ejected, wherein the second information may include a message prompting performing of the posttreatment.

The posttreatment unit performs the posttreatment on the fabric, thereby improving the rubbing fastness of the fabric. According to the above-described configuration, when the estimation level is lower than the target level, the user can understand that the posttreatment by the posttreatment unit should be performed.

(F) In the above-described printing system described above, the second information may include a message prompting replacement of the pretreatment liquid.

According to the above-described configuration, when the estimation level is lower than the target level, the user can understand that the pretreatment liquid should be replaced.

(G) An estimation method is an estimation method for estimating a rubbing fastness of a fabric to which a pretreatment liquid is to be applied, the estimation method including acquiring freshness information regarding freshness of the pretreatment liquid to be applied to the fabric and use date information indicating a time to start using the pretreatment liquid, and outputting, based on the freshness information, the use date information, and a data table indicating a correspondence relationship between a time elapsed from manufacture of the pretreatment liquid and the rubbing fastness of the fabric on which the pretreatment liquid was used, an estimation level of the rubbing fastness to be obtained by using the pretreatment liquid at the time indicated by the use date information. According to the above-described method, the same effect as that of the above-described printing system can be obtained.

What is claimed is:

1. A printing system comprising:

a pretreatment unit configured to apply a pretreatment liquid to a fabric;

a printing unit configured to eject a printing liquid to the fabric to which the pretreatment liquid was applied;

a storage unit configured to store a data table indicating a correspondence relationship between a time elapsed from manufacture of the pretreatment liquid and a rubbing fastness of the fabric on which the pretreatment liquid was used; and a control unit, wherein the control unit includes:

an acquisition unit configured to acquire freshness information regarding freshness of the pretreatment liquid to be applied by the pretreatment unit and use date information indicating a time to start using the pretreatment liquid and an estimation unit configured to output, based on the freshness information, the use date information, and the data table, an estimation level of the rubbing fastness to be obtained by using the pretreatment liquid at the time indicated by the use date information.

2. The printing system according to claim 1, wherein the storage unit stores the data table for an individual type of the fabric, the acquisition unit acquires fabric type information indicating a type of the fabric to be used for printing, and the estimation unit outputs the estimation level based on the freshness information, the use date information, the fabric type information, and the data table.

3. The printing system according to claim 1, wherein the storage unit stores the data table for an individual color of the printing liquid and the estimation unit outputs, based on the freshness information, the use date information, and the data table, the estimation level for the individual color of the printing liquid.

4. The printing system according to claim 1, further comprising a display unit configured to display information, wherein the acquisition unit acquires a target level indicating a rubbing fastness desired by a user, the control unit includes a determination unit configured to determine whether the estimation level output by the estimation unit is equal to or higher than the target level, the display unit displays first information when the determination unit determines that the estimation level is equal to or higher than the target level, and the display unit displays second information different from the first information when the determination unit determines that the estimation level is lower than the target level.

5. The printing system according to claim 4, further comprising a posttreatment unit configured to perform posttreatment on the fabric to which the printing liquid was ejected, wherein the second information includes a message prompting performing of the posttreatment.

6. The printing system according to claim 4, wherein the second information includes a message prompting replacement of the pretreatment liquid.

7. An estimation method for estimating a rubbing fastness of a fabric to which a pretreatment liquid is to be applied, the estimation method comprising:

acquiring freshness information regarding freshness of the pretreatment liquid to be applied to the fabric and use date information indicating a time to start using the pretreatment liquid; and outputting, based on the freshness information, the use date information, and a data table indicating a correspondence relationship between a time elapsed from manufacture of the pretreatment liquid and the rubbing fastness of the fabric on which the pretreatment liquid was used, an estimation level of the rubbing fastness to be obtained by using the pretreatment liquid at the time indicated by the use date information.

* * * * *